United States Patent
Onodera et al.

[11] Patent Number: 5,904,224
[45] Date of Patent: May 18, 1999

[54] ELECTRIC POWER STEERING UNIT

[75] Inventors: Tsugio Onodera, Azuma-mura; Tadao Kodaira, Maebashi; Yoshiaki Taniguchi, Kiryu, all of Japan

[73] Assignee: Mitsuba Corporation, Gunma, Japan

[21] Appl. No.: 08/925,291

[22] Filed: Sep. 8, 1997

[30] Foreign Application Priority Data

Sep. 24, 1996 [JP] Japan ................................ 8-252046
Sep. 24, 1996 [JP] Japan ................................ 8-252049
Sep. 24, 1996 [JP] Japan ................................ 8-252050

[51] Int. Cl.$^6$ .................................................. B62D 5/04
[52] U.S. Cl. ........................................ 180/444; 180/443
[58] Field of Search ................................ 180/444, 443; 74/388 PS

[56] References Cited

U.S. PATENT DOCUMENTS

| | | | |
|---|---|---|---|
| 4,766,970 | 8/1988 | Shimizu | 180/444 |
| 4,773,497 | 9/1988 | Carlson et al. | 180/444 |
| 5,650,701 | 7/1997 | Shimizu et al. | 318/489 |
| 5,685,390 | 11/1997 | Chikuma et al. | 180/444 |

*Primary Examiner*—Lanna Mai
*Assistant Examiner*—Michael Cuff
*Attorney, Agent, or Firm*—McCormick, Paulding & Huber

[57] ABSTRACT

An electric power steering unit includes a rack-shaft(2) to be coupled to the guiding wheels of a vehicle, a housing A for slidably containing the rack-shaft(2)and holding therein a coupling section(6)for causing the teeth of the rack-shaft(2) to engage those of a pinion arranged on the steering column (5)linked to the steering handle of the vehicle and an electric motor(1) coaxially arranged around the rack-shaft(2), which the rotary force is transmitted to the rack-shaft(2)by way of a ball screw mechanism 3 as the steering assisting power. A nut section(19)of the ball-screw mechanism(3)is rotatably supported by a housing(B) separately formed from the housing(A), in a state of supporting the armature shaft(11)of the electric motor(1). The rack-shaft(2) is axially movable and supported by two points of support, one at the coupling section and the other at the nut section supported by the housing(B). Thus, the rack-shaft is not supported by three points such as the conventional power steering unit but supported by two points, the precision requirements for the components are eased and hence the manufacturing cost thereof is reduced.

8 Claims, 9 Drawing Sheets

ELECTRIC POWER STEERING UNIT

BACKGROUND OF THE INVENTION

1. Field of the Invention

This invention relates to an electric power steering unit to be used for a vehicle and, more particularly, it relates to a field of technology effectively applicable to electric power steering gears to be used for rack and pinion type steering systems.

2. Related Art Statement

In recent years, most vehicles are equipped with a so-called power steering gear, and various type power steering unit, such as a hydraulically or electrically operated type power steering unit has been designed to assist the steering power of the vehicle. In these electric power steering units, as one for applicable to rack and pinion type steering systems, a unit which the steering assisting power is obtained by an electric motor arranged coaxially with a rack-shaft, as Japanese Patent Application Laid-Open No. 8-98451, is known.

Figure 11:
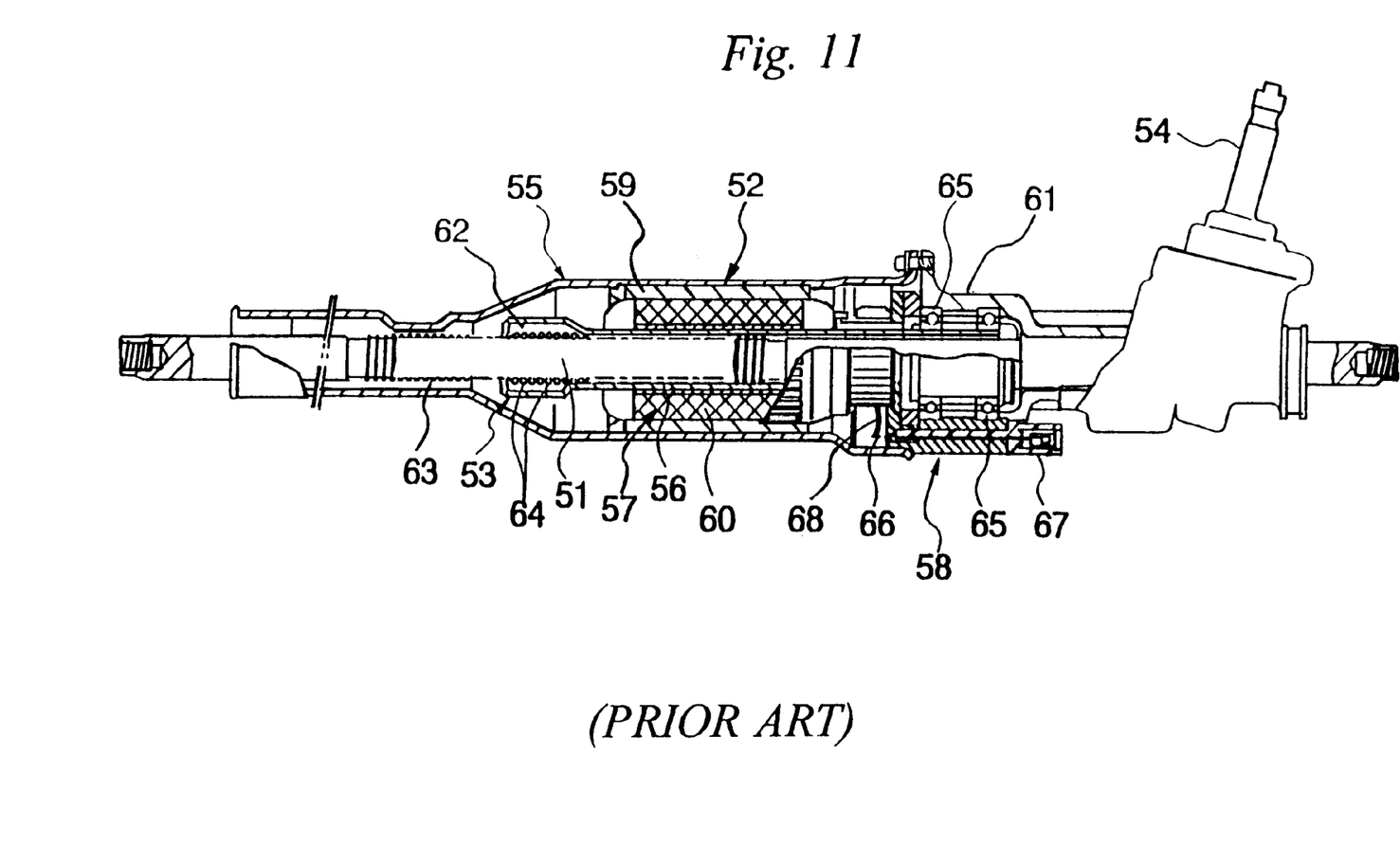
FIG. 11 is a schematic cross sectional view of a conventional power steering unit, showing its overall configuration.

Such an electric power steering unit shown in FIG. 11, comprises an electric motor 52 arranged coaxially with a rack-shaft 51 so that the steering assisting power generated by the electric motor 52 is transmitted to the rack-shaft 51 by way of a ball screw mechanism 53. Then, the guiding wheels of the vehicle can be turned by utilizing both the manual steering power of the driver and the steering assisting power.

The rack-shaft 51 is linked to the guiding wheels (which hereinafter may simply be referred to as "the wheels") typically by way of tie rods or knuckle arms arranged at the respective opposite ends thereof and also linked to the steering column 54 that is coupled to the steering wheel (which hereinafter may be referred to as "the handle") by way of a rack and pinion gear so that it may be reciprocatively moved in the horizontal directions of FIG. 11 as the steering operation by the driver. The electric motor 52 has a cylindrical yoke 55 containing coaxially therein a cylindrical armature shaft 56 and a field device 57 and is fed with power from a power supply section 58. The field device 57 comprises magnets 59 arranged on the inner peripheral portion of the yoke 55 and an armature core 60 arranged on the outer peripheral portion of the armature shaft 56. The rotary power generated by the electric motor 52 is transmitted to the rack-shaft 51 and the power is converted into the reciprocatively movement by way of a ball screw mechanism 53 arranged at the left end of the armature shaft 56 in FIG. 11, so that steering power is assisted. Note that the armature shaft 56 is supported at a right side portion thereof by an angular bearing 65 held within housing 61.

With a power steering unit having the above described configuration, the rack-shaft 51 is supported at two points including the coupling section connecting itself to the steering wheel 54 and the ball-screw mechanism 53. Firstly, since the rack-shaft 51 is coupled at an end thereof to the steering wheel 54 by means of a gear engagement by a rack and pinion gear system, rigidity of this point is high and it provides a point of support for the rack-shaft 51. Additionally, a housing 61 holding the coupling section is rigidly secured to the vehicle main body so that the rack-shaft 51 is in effect supported by the vehicle main body. Secondly, rack-shaft 51 is supported at the opposite end thereof by a ball-screw mechanism 53 arranged at an end of the armature shaft 56. The ball-screw mechanism 53 comprises a nut section 62 and a screw section 63 that are tightly combined together with balls 64 interposed therebetween. The nut section 62 is press-fit into and caulked against the armature shaft 56 to provide another point of support for the rack-shaft 51.

The armature shaft 56 is rotatably held by the ball-screw mechanism 53 and a angular bearing 65. Thus, the ball-screw mechanism 53 provides a point of support for the armature shaft 56, while the housing 61 provides another point of support for the armature shaft 56 as the angular bearing 65 is tightly fitted to the housing 61.

The performance of a power steering unit of the type under consideration is typically measured in a manner as described below. If the electric motor 52 is installed after fitting the nut section 62 of the ball-screw mechanism 53 to the armature shaft 56 and subsequently the yoke 55 is placed in position, the entire unit is covered by outer shell elements so that the performance of the electric motor 52 can be determined only by way of the thrust of the rack-shaft 51 because it is no longer possible to directly measure the performance of the electric motor 52 itself. Therefore, for the purpose of the present invention, the electric motor 52 is measured for its performance before fitting the nut section 62 to the armature shaft 56. In other words, the unit is assembled and covered by the yoke 55 without the nut section 62. Next, the revolutions per minute and the torque of the electric motor 52 are measured by using the space where the nut section 62 is to be installed. After the operation of measuring the performance of the electric motor 52 is over, the yoke 55 is removed temporarily and the nut section 62 is placed in position, then the yoke 55 is put back again to complete the assembling operation.

The ball screw mechanism 53 has a well known constitution, which comprises a large number of balls 64 arranged between a nut section 62 and a screw section 63 thereof, the nut section 62 being press-fit into and caulked against the armature shaft 56. With this arrangement, the rotary power of the electric motor 53 is transmitted to the rack-shaft 51 by way of the nut section 62, the balls 64 and the screw section 63 to produce axial reciprocative power there, which is then used to assist the steering power.

When the guiding wheels of the motor vehicle is turned to an extreme, one of the tie rod stoppers (not shown) arranged at the both opposite ends of the rack-shaft 51 comes to abut the housing 61 and the yoke 55 at the end portion thereof to limit the turning motion of the wheels. As the stopper abuts these corresponding components, the rotary members of the armature shaft 56 revolving with the rack-shaft 51 are also stopped and the rack-shaft 51 is subjected to an impact due to the force of inertia of the rotary members. Then, the armature shaft 56 receives the reaction force from the ball-screw mechanism 53.

If, for example, one of the stoppers abuts the left end of the yoke 55 shown in FIG. 11, the rack-shaft 51 is subjected to force trying to move it further right in FIG. 11 due to the inertia of the armature shaft 56 and other related components. Then, the armature shaft 56 receives the reaction force of the rack-shaft 51 in the form of tensile force. If, on the other hand, the other stopper abuts the housing 61 at the right end in FIG. 11, the rack-shaft 51 is subjected to force trying to move it further left in FIG. 11 due to the inertia of the electric motor 52 and then the armature shaft 56 receives the reaction force of the rack-shaft 51 in the form of compressive force. Thus, with the power steering unit of FIG. 11, the armature shaft 56 is subjected not only to rotary force but also to tensile force and compressive force and hence the armature shaft 56 is solidly coupled to the nut section 62 in such a way that it seems as if the nut section 62 were wrapped by the armature shaft 56.

However, with such a conventional power steering unit, while the rack-shaft 51 apparently has two points of support, it in effect has three points of support because the armature shaft 56 linked to the rack-shaft 51 by way of the ball-screw mechanism 53 is also supported by the angular bearing 65 that is fitted to the housing 61, so that consequently the rack-shaft 51 can be more often than not subjected to friction due to jarring, twisting and misaligning of related components and that can give rise to problems, such as jarring, an unpleasant steering feeling and reluctant movement of the steering wheel in recovering. While, since very severe precision is required for each component and assembling to avoid these problems, there is such a problem that the manufacturing cost becomes high in terms of machining precision and product management.

Additionally, with a conventional power steering unit, the yoke 55 installed in position has to be temporarily removed to measure the performance of the electric motor 52 and then put back in position once again. In addition to the fact that this is a cumbersome procedure, there arises a problem that the performance of the electric motor 52 may behave differently when it is measured for performance and when it is completely assembled. In this case, the because the performance of the electric motor 52 is not tested at the complete assembling state and its performance is only estimated on the basis of the data obtained before re-assembling.

Still additionally, the yoke is already provided with unmagnetized magnets, which are magnetized after it is combined with an armature because a yoke having magnetized magnets can hardly assemble to armature. However, since the yoke 55 is removed to measure the performance of the electric motor 52 after magnetizing the magnets, the yoke 55 is still accompanied by the problem of removing. In the first place, it is not easy to pull out the magnetized yoke 55 from its position. Secondly, the yoke 55 attracts the armature vigorously and abut it due to its magnetic force to damage the surrounding elements.

With such a power steering unit, the armature shaft 56 has a complicated profile as shown in FIG. 11 and can be machined only with difficulties. Additionally, the nut section 62 is press-fit into and caulked against the armature shaft 56 in such a way that it seems as if the nut section 62 were wrapped by the armature shaft 56. This arrangement is entailed by an assembling problem.

Finally, since the armature shaft 56 is subjected not only to rotary force but also to tensile force and compressive force, it has to meet rigorous strength-related requirements particularly in terms of material, manufacturing process and machining accuracy despite that it has such a complicated profile to consequently give rise to a problem of high manufacturing cost.

SUMMARY OF THE INVENTION

An object of the present invention is to provide a power steering unit comprising a rack-shaft that has two points of support in stead of three points of support of conventional power steering units and can ease precision requirements to reduce the cost of manufacturing the power steering unit.

Another object of the present invention is to provide a power steering unit comprising an electric motor that can be measured easily for performance and is free from the above identified problems of a magnetized yoke.

Still another object of the present invention is to provide a power steering unit comprising a ball-screw mechanism that can be installed without difficulty.

A further object of the power steering unit is to provide a power steering unit that can effectively prevent adversely affecting force from being generated by the inertia of the electric motor to make the strength-related requirements of the components less rigorous.

According to the invention, there is provided an electric power steering unit comprising a rack-shaft to be coupled to the guiding wheels of a vehicle, a first housing for slidably containing the rack-shaft and holding therein a coupling section for causing the teeth of the rack-shaft to engage those of a pinion arranged on the steering column linked to the steering handle of the vehicle, an electric motor coaxially arranged around the rack-shaft to supply assisting power to the rack-shaft and a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering. The nut section of the ball-screw mechanism is rotatably supported by a second housing arranged independent of the first housing, in a state of supporting the armature shaft and the rack-shaft is axially movable and supported at two points of support, one at the coupling section and the other at the nut section supported by the second housing.

Preferably, the second housing is positionally regulatable to correct any misalignment of the rack-shaft.

Preferably, the nut section of the ball-screw mechanism is separably linked to the armature shaft.

Still preferably, the nut section and the armature shaft are provided at the oppositely disposed respective ends thereof with tapered splines that are engaged with each other to link the nut section and the armature shaft.

Alternatively, the nut section and the armature shaft are provided at the oppositely disposed respective ends thereof with tapered frictional surfaces that are pressed against each other to link the nut section and the armature shaft.

Preferably and additionally, the nut section of the ball-screw mechanism is linked to the armature shaft by means of a torque limiter mechanism.

Then, preferably, the torque limiter mechanism is so configured that tapered frictional surfaces respectively arranged at the oppositely disposed respective ends of the nut section and the armature shaft are pressed against each other by means of an elastic member arranged at the other end side of the armature shaft.

The above-described and other objects, and novel feature of the present invention will become apparent more fully from the description of the following specification in conjunction with the accompanying drawings.

DESCRIPTION OF THE PREFERRED EMBODIMENT

Figure 1:
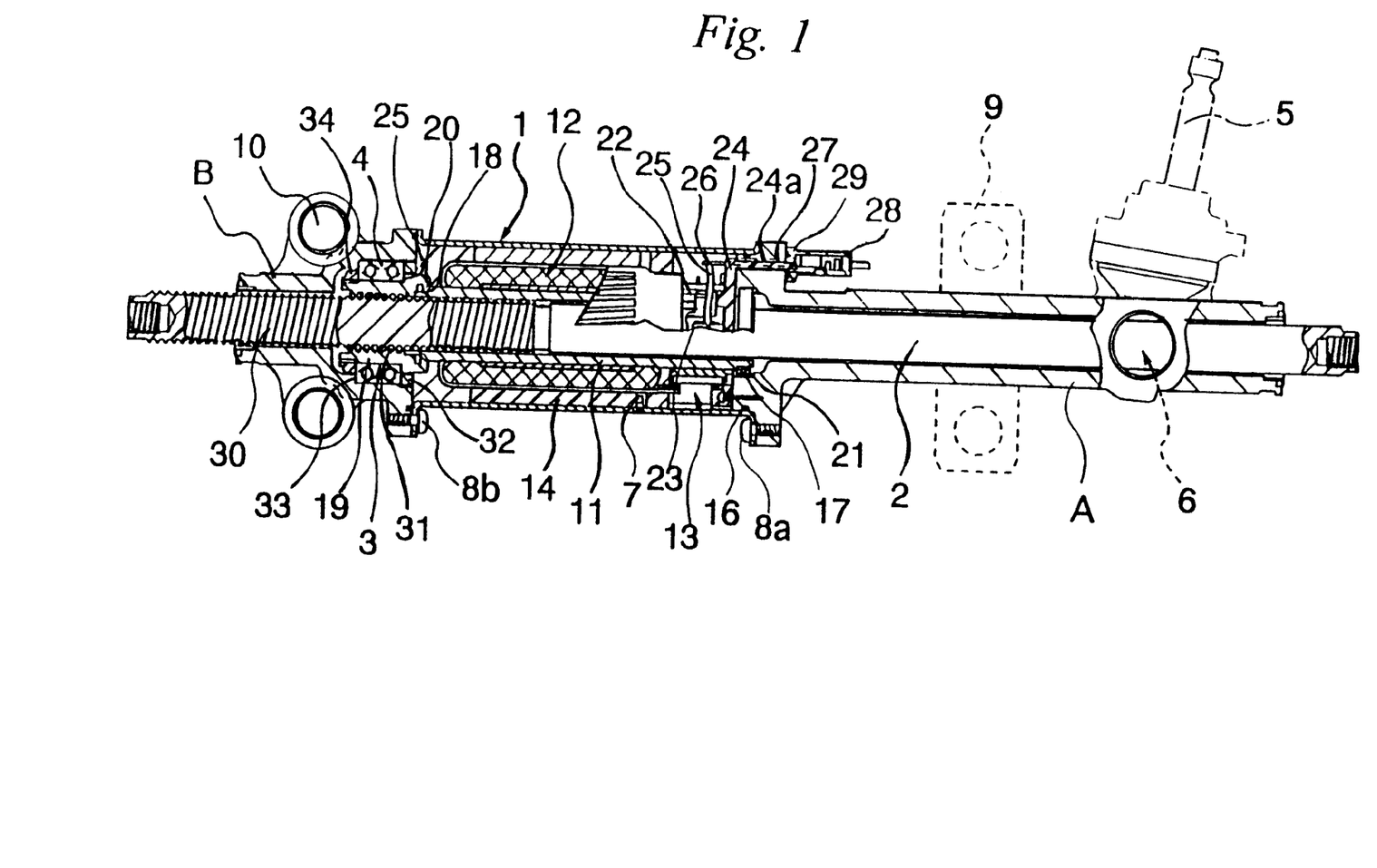
FIG. 1 is a schematic cross sectional view of a first embodiment of power steering unit according to the invention, showing its overall configuration.
Figure 2:
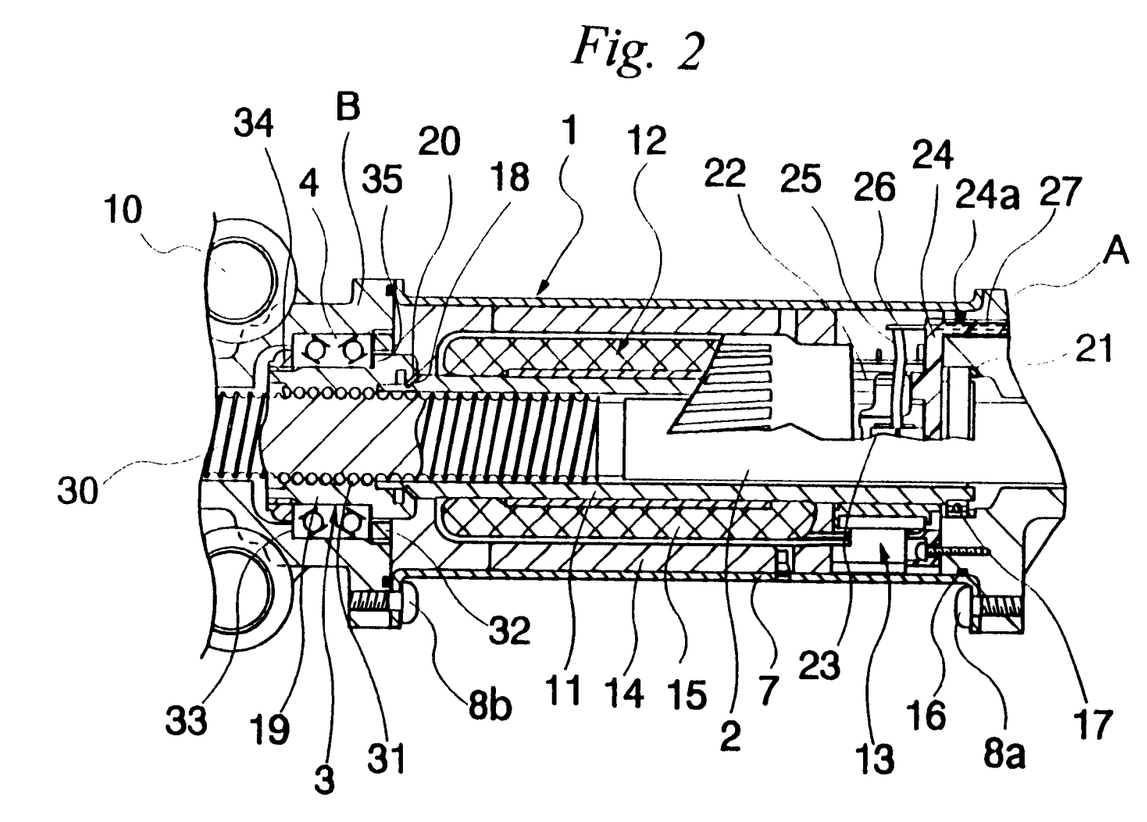
FIG. 2 is an enlarged schematic cross sectional view of the embodiment of power steering unit of FIG. 1, showing its principal area.

Now, the invention will be described in greater detail by referring to the accompanying drawings that illustrate preferred embodiments of the invention. FIG. 1 is a schematic cross sectional view of a first embodiment of electric power steering unit according to the invention, showing its overall configuration. FIG. 2 is an enlarged cross sectional partial view of the embodiment of power steering unit of FIG. 1, showing its principal area.

Figure 6:
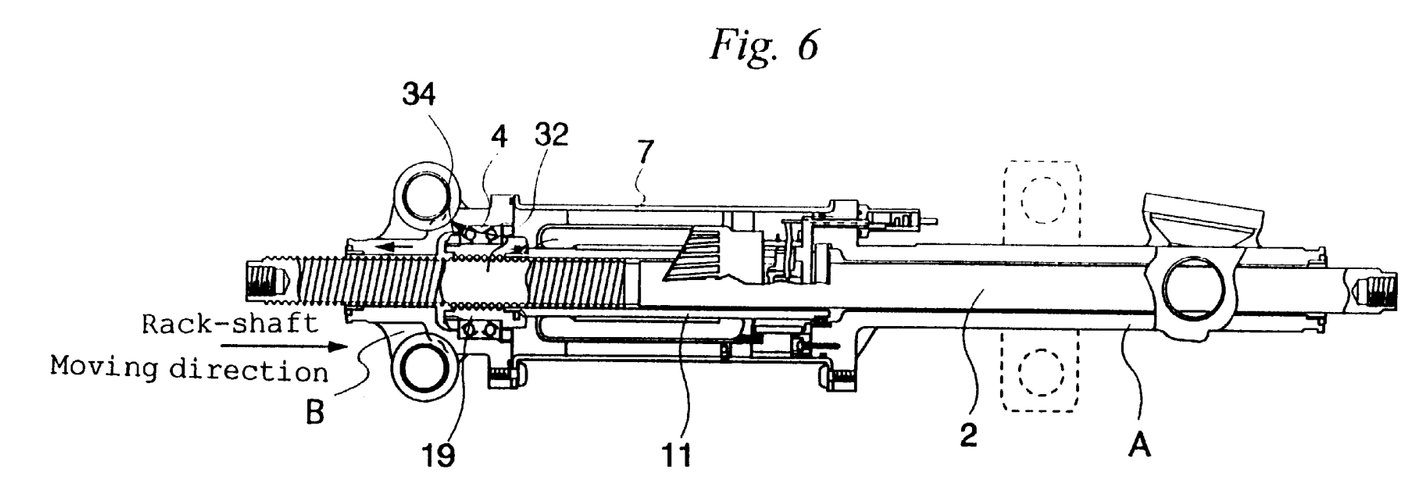
FIG. 6 is a schematic cross sectional view showing the power transmission path established when the stopper fitted to the left side of the rack-shaft abuts the corresponding housing.

As seen from FIGS. 1 and 2, the electric power steering unit (hereinafter referred to as "power steering unit") is provided with an electric motor 1 having a hollow central area and arranged around a rack-shaft 2 as in the case of the conventional power steering units shown in FIG. 6 and, for example, the unit is fitted to the steering gear of the wheels of a vehicle that are typically the front wheels. The steering assisting power generated by the electric motor 1 is transmitted to the rack-shaft 2 via a ball screw mechanism 3 to reduce the physical load for steering the vehicle on the part of the driver. The power steering unit according to the invention has a remarkable feature that the rack-shaft 2 is supported by two points by means of being integrally arranged the ball-screw mechanism 3 with an angular bearing 4, as a result, the precision requirements of parts and assembling can be eased.

As shown in FIG. 1, the power steering unit further comprises a housing A (first housing) and a housing B (second housing), which are securely coupled to yoke 7 of the electric motor 1 by means of a plurality of respective screws 8a and 8b, and the rack-shaft 2 is arranged in them in such a way that it may be moved to the right and the left direction in FIG. 1. Then, the power steering unit 1 is fitted to the vehicle main body by means of a bracket 9 and fitting holes 10 of the housing B and, at the same time, the wheels are linked to the respective ends of the rack-shaft 2 by means of tie rods or knuckle arms.

The housing A is a hollow member typically made of cast iron or die-cast aluminum and a coupling section 6 is arranged at the right side end of the unit in FIG. 1 for coupling the rack-shaft 2 with the steering column 5 of the vehicle that is further linked to the steering wheel. In this coupling section 6, a pinion (not shown) arranged on the steering column 5 and the teeth of a rack arranged on the outer side portion of the rack-shaft 2 are engaged with each other so that the rotary motion of the steering column 5 is converted into a reciprocative motion of the rack-shaft 2 that moves right and left direction in FIG. 1. In this case, the coupling section is so designed as to support the rack-shaft 2 by gear engagement to provide a point of support for the rack-shaft 2 as in the case of conventional power steering units. Note, a torque sensor (not shown) is arranged on the coupling section 6 to detect the torque of the steering column 5 so that the power output of the electric motor 1 may be controlled as a function of the detected torque.

The electric motor 1 has a cylindrical yoke 7 containing coaxially therein a cylindrical armature shaft 11 and a field device 12. The rack-shaft 2 is assembled to runs through the inside of the armature shaft 11. The field device 12 comprises a plurality of magnets 14 arranged on the inner peripheral surface of the yoke 7 and an armature core 15 arranged on the outer peripheral portion of the armature shaft 11 and is fed with electric power from a power supply section 13.

The yoke 7 is a hollow and cylindrical member made of iron and having a profile of a cylindrical pipe with a substantially constant thickness. It contains therein the field device 12 and the power supply section 13. The yoke 7 is securely and airtightly connected to the housing A at the right side end thereof in FIG. 1 by means of a plurality of screws 8a and an O-ring 16. On the other hand, it is securely connected to the housing B at the left side end in FIG. 1 also by means of a plurality of screws 8b. As will be described hereinafter, the operation of linking these components is conducted while correcting the misalignment, if any, of the rack-shaft 2.

The magnets 14 of the field device 12 operates as field poles and are arranged peripherally at regular intervals in the yoke 7. On the other hand, the armature shaft 11 is held at an end thereof (the right side end in FIGS. 1 and 2) by a bearing 17 fitted to the housing A and provided on the other end (the left side end in FIGS. 1 and 2) with a tapered spline 18, which is engaged with a corresponding spline 20 formed at an end of a nut section 19 of the ball-and-screw mechanism 3 so that the rotary motion of the armature shaft 11 is transmitted to the nut section 19. Note that the armature shaft 11 of this embodiment has a simplified profile and is down-sized to reduce the manufacturing cost as well as the force of inertia it produces if compared with its counterpart of the conventional power steering unit of FIG. 11 and hence the electric motor 1 can also be down-sized to show a quick response time.

Note that a rubber member 21 is fitted to a right side portion of the bearing 17 to urge the armature shaft 11 against the side of the nut section 19 by means of the elastic force of the rubber member 21. Thus, the spline 18 is urged against and engaged with the spline 20 so that the rotary motion of the armature shaft 11 is securely transmitted to the nut section 19. Because of the rubber member 21 arranged on the right side of the bearing 17, the armature shaft 11 is held in position but allowed to move to a small extent. Note that the rubber member 21 can be replaced by an equivalent member that may be made of any appropriate material and have any contour so long as it axially urges the armature shaft 11. For example, it may be replaced by a coned disc spring, a wave washer or a member made of synthetic resin.

A rubber member 21 is fitted to a right side portion of the bearing 17 to axially urge the armature shaft 11 against the nut section 19 by means of the elastic force of the rubber member 21. Thus, as the spline 18 is urged against and held in engagement with the spline 20, the rotary motion of the armature shaft 11 is securely transmitted to the nut section 19. Because of the rubber member 21 arranged on the right side of the bearing 17, the armature shaft 11 is held in position but allowed to move to a small extent. Also note that the rubber member 21 can be replaced by an equivalent member that may be made of any appropriate material and have any contour so long as it puts the armature shaft 11 under pressure to axially urge it. For example, it may be replaced by a coned disc spring, a wave washer or a member made of synthetic resin.

Because of the tapered arrangement of the splines 18 and 20 of this embodiment of power steering unit, when rotated, they are free form a gap at the junction thereof and at the steering wheel of the motor vehicle unlike straight splines. Additionally, since the splines of this embodiment are rectangular splines, they are free from the problem of involute splines that can generate axial thrust force to axially displace the armature shaft 11 until the splines themselves are disengaged from each other. Note, however, that they may be replaced involute splines if the force biasing the armature shaft 11 is large enough to avoid the problem of axial displacement.

Japanese Utility Design Application Laid-Open No. 2-125883 discloses an electric power steering unit having splines linked together by compressive elastic force that urges both the driving side and the driven side. A gap is avoided by causing imperfect sections of the splines to push each other. However, it disclosed only splines arranged in parallel with the shaft and does not disclose tapered splines like those used in this embodiment. In other words, the two inventions are different in terms of a gap prevention means and the cited reference document does not disclose a power steering unit according to the present invention.

The power supply section 13 is designed to feed the armature with electricity and comprises a commutator 22 rigidly secured to the armature shaft 11 and a brush 23 held in contact with the peripheral surface of the commutator 22 to provide electric contact points between them. The brush 23 is held in a brush holder formed integrally with a brush holder stay 24 that is made of synthetic resin and pressed against the commutator 22 under a predetermined pressure by means of an elastic member (not shown). On the other hand, a terminal plate 26 having an end connected to a pig tail 25 of the brush 23 by spot welding is made to run through a projecting section 24a of the brush holder stay 24 by means of an insertion molding technique. Then, the brush holder stay 24 is secured to the housing A with screws in such a way that the front end of the projecting section 24a is projecting to the outside through a hole 27 of the housing A. Thus, the terminal plate 26 projects from the housing A with the projecting section 24a of the brush holder stay 24 to form a power supply terminal.

Figure 4:
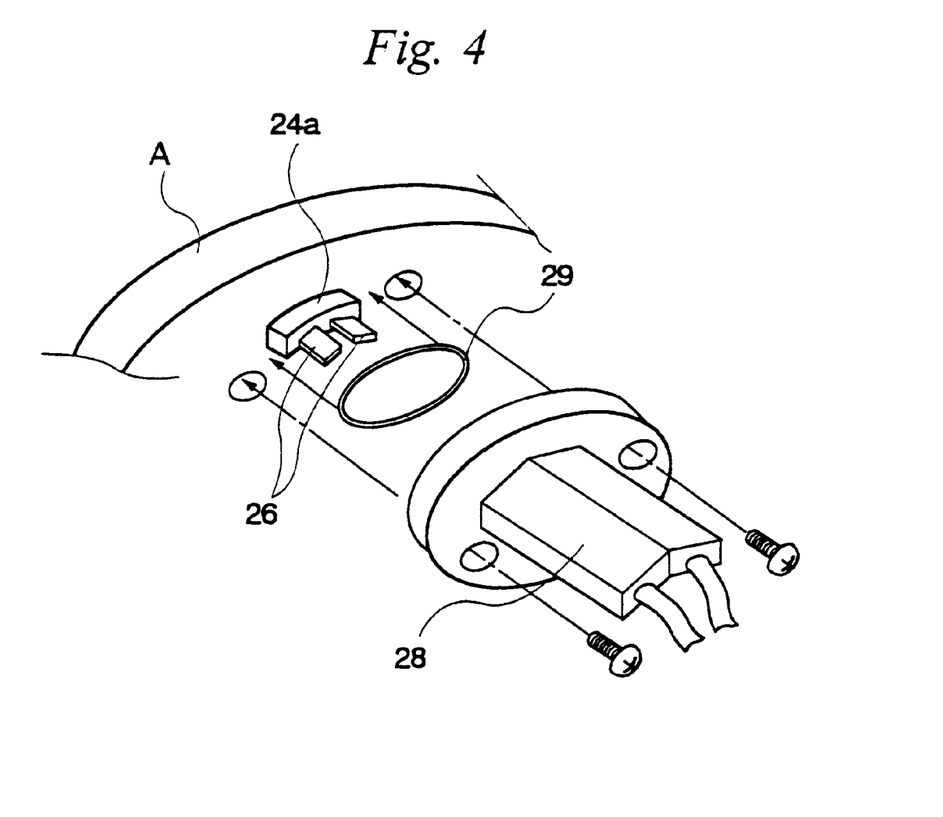
FIG. 4 is a schematic perspective view of the power supply terminal of the embodiment of FIG. 1, illustrating how a coupler is fitted thereto.

FIG. 4 is a schematic perspective view of the power supply terminal, illustrating how a coupler 28 is fitted thereto. Referring to FIG. 4, the terminal plate 26 projects to the outside of the housing A with the projecting section 24a to provide a male terminal and a waterproof female coupler 28 is secured to it by means of screws with an O-ring 29 interposed therebetween. It should be noted here that any interruption to the supply of power to the electric motor 1, if instantaneous, is not allowed from the viewpoint of assisting the manual power applied to the steering wheel by the driver for maneuvering the vehicle. Since the coupler 28 is rigidly secured to the housing A by means of screws in this embodiment of power steering unit, the coupler 28 is prevented from being unfastened to get out of power supply due to vibrations to improve the reliability of the unit.

Meanwhile, in the conventional power steering unit, the terminal is secured to the housing 61 by inserting a coupler 67 (male side) formed integrally with the terminal 66 and rigidly securing an end of the terminal 66 to a pig tail 68 of the brush as shown in FIG. 11. With this arrangement of the conventional power steering unit, the terminal 66 and the pig tail 68 are connected to each other by spot welding after fitting the coupler 67 to the housing 61. Therefore, with the conventional power steering unit, the welding operation has to be carried out by rigidly anchoring the relatively large housing 61 and it makes the operation rather cumbersome. Additionally, since the coupler 67 is not adapted to disassembling, either the housing 61 has to be replaced or the pig tail 68 and the terminal 66 have to be cut off from each other to replace the brush. In the latter case, the new brush has to be connected to the pig tail by spot welding for another time.

This embodiment employs a terminal configured in a manner as described above, thus, in this embodiment, the brush holder stay 24 and the pig tail 25 are connected with each other by spot welding so that they may collectively be handled efficiently as a subassembly. Additionally, they can be easily separated from the housing A so that only the brush holder stay 24 have to be replaced when the brush 23 is replaced. Thus, the number of components that have to be replaced for maintenance and consequently the efficiency of maintenance operation is significantly improved. Still additionally, the coupler 67 of the conventional power steering unit is omitted from this embodiment to reduce the total number of components to reduce the manufacturing cost.

The housing B is, like the housing A, a hollow member typically made of cast iron or die-cast aluminum and provided in the inside with a ball-and-screw mechanism 3. The ball-and-screw mechanism 3 per se is known and comprises a nut section 19, a screw section 30 formed on the outer peripheral wall of the rack-shaft 2 and a number of balls 31 arranged between the nut section 19 and the screw section 30. The rack-shaft 2 is supported by the nut section 19 in such a way that its rotary motion around the axis of rotation is restricted but it is reciprocated right and left direction in FIG. 1 as the nut section 19 is rotated.

The nut section 19 is axially rotatable relative to the housing B with an angular bearing 4 interposed therebetween and securely fitted to the housing B. Thus, unlike the conventional power steering unit of FIG. 11 wherein the nut section of the ball-and-screw mechanism and the angular bearing are independently arranged, the nut section 19 of the ball-and-screw mechanism 3 and the angular bearing 4 are combined to form a unitary member and arranged in the housing B that is separated from the housing A in this embodiment of power steering unit according to the invention. Note that, unlike the conventional power steering unit of FIG. 11, the nut section 19 is contained in and rigidly held to the housing B as a component independent of the armature shaft 11 so that the nut section 19 and the armature shaft 11 are linked together when the above described splines 18 and 20 are engaged with each other.

The angular bearing 4 is securely held between a bearing holder ring 32 screwed into an opening of the housing B and a stepped section 33 formed in the housing B to restrict its axial movement. The relative axial movement of the nut section 19 and the angular bearing 4 is restricted by another bearing holder ring 34 screwed into the left end of the nut section 19 and another stepped section 35 formed on the outer peripheral wall of the nut section 19.

As mentioned above, the rack-shaft 2 of this embodiment is supported in the housing B by the nut section 19 that is held by the angular bearing 4 rigidly fitted to the housing B. Thus, the nut section 19 provides another point of support for the rack-shaft 2. While the armature shaft 11 is supported by a bearing 17 at the side where the commutator 22 is arranged, this bearing 17 contains balls in the inside and hence may produce a slight gap between the inner ring and the outer ring thereof. In other words, the rack-shaft 2 of this embodiment has only two points of support, one at the coupling section 6 of the housing A and the other at the nut section 19 of the ball-screw mechanism 3. At this point, the power steering unit of this invention is different from the conventional one which has substantially three points of support.

On the other hand, a tapered spline 20 is formed at the right end of the inner cylindrical space of the nut section 19 and engaged with a corresponding spline 18 of the armature shaft 11. Thus, the armature shaft 11 and the nut section 19 are coupled firmly so that they can be handled as a unitary member. More specifically, the armature shaft 11 is supported by the bearing 17 and the nut section 19 and the rotary motion of the armature shaft 11 is effectively transmitted to the nut section 19. Therefore, as the armature shaft 11 rotates, the nut section 19 is rotated accordingly to reciprocatively move the rack-shaft 2 right and left direction under the effect of the ball-and-screw mechanism 3.

Note, since the rack-shaft 2 is bent by the external force typically applied to it by the wheels, a clearance considering the quantity of the bending has to be provided between the rack-shaft 2 and the armature shaft 11. Conventionally, the relationship between the quantity of the bending and the points where the rack-shaft 2 is supported is not considered and the supporting points are arbitrarily selected. As a result, the clearance has to be made excessively large to accommodate any possible bending of the rack-shaft 2 and baffle any attempt to down-size the unit. To the contrary, in view of the fact that the rack-shaft 2 is supported at two points of the ball-and-screw mechanism 3 and the coupling section 6, the bending of the rack-shaft 2 is minimized by equalizing the distances from the opposite ends of the rack-shaft 2 to the respective supporting points in this embodiment of power steering unit, provided that the rack-shaft 2 shows a same rigidity at the two supporting points. If the rack-shaft 2 shows different rigidity values at the two supporting points, the bending of the rack-shaft 2 can be minimized by appropriately selecting the supporting points, taking the ratio of the rigidity values into consideration. The clearance between the rack-shaft 2 and the armature shaft 11 can be minimized by minimizing the bending of the rack-shaft 2 to reduce the overall dimensions and hence the manufacturing cost of the unit.

The above described embodiment of power steering unit is assembled in a manner as described below.

Firstly, said four major components are prepared. A rubber member 21, a bearing 17, a brush holder stay 24 and other parts are fitted to the housing A. Then, magnets 14 and other parts are fitted to the inside of the yoke 7. An armature core 15, an commutator 22 and other parts are arranged on the armature shaft 11. A ball-screw mechanism 3 combining an angular bearing 4 and a rack-shaft 2 are arranged in the housing B.

Then, the housing A and the armature shaft 11 are fitted to each other and the yoke 7 is secured to the housing A by means of screws. The housing B carrying the rack-shaft 2 and the yoke 7 are secured to each other also by means of screws. Thereafter, the rack-shaft 2 put into the housing A is linked to the steering column 5 and the teeth of the pinion on the steering column 5 are made to engage with those of the rack on the rack-shaft 2.

Since the ball-screw mechanism 3 is separable from the armature shaft 11 of this embodiment, the performance of the electric motor 1 per se can be measured at this stage of assembling. More specifically, an appropriate bearing is used to receive the end of the armature shaft 11 so that the electric motor 1 may be measured for the revolutions per minute and the torque through there.

For fitting the housing B to the yoke 7, the spline 18 formed on the end of the armature shaft 11 is engaged with the spline 20 formed on the nut section 19, after then the yoke 7 and the housing B are secured to each other by means of screws. Thus, with this embodiment of power steering unit, the housing B can be secured to the yoke 7 after positionally regulating it in order to prevent the rack-shaft 2 from falling down and/or shaking so that any misalignment on the part of the rack-shaft 2 due to eccentricity from the center may be absorbed and corrected. Note that yoke 7 is provided with a hole 36 for receiving a screw 8b having a diameter greater than that of the screw 8b so that the housing B may be positionally regulated by utilizing the clearance between the screw 8b and the screw hole 36.

As pointed above, the rack-shaft 2 of this embodiment has only two points of support, one being the coupling section 6 for coupling the rack-shaft 2 to the steering column 5 located on the side of the housing A, the other being the nut section 19 on the side of the housing B and it is supported only by the coupling section 6 when the housing B is arranged in position. Additionally, as described above, the armature shaft 11 that is supported by the bearing 17 is somewhat floating. Therefore, when the housing B is arranged in position the housing B can be subjected to positional adjustment according to any misalignment of the rack-shaft 2 including the armature shaft 11. Thus, the nut section 19 that provides another point of support can be placed in position after any possible misalignment of the rack-shaft 2 is accommodated. In other words, gap absorbing and friction reducing can be accomplished by positionally regulating the housing B. Therefore, rigorous precision requirements for the parts and assembling is unnecessary and the cost of manufacturing the power steering unit is reduced.

Additionally, since the housing B can be arranged in position after measuring the performance of the electric motor 1 per se, it is not necessary to conduct the cumbersome operations required for conventional power steering units including that of removing the yoke 7 placed in position in order to mount the electric motor 1. Thus, the process for assembling the power steering unit is greatly simplified and the performance of the electric motor 1 can be obtained accurately and easily under actual operating conditions without removing the yoke 7.

The housing A is fitted to the vehicle main body by means of a bracket 9 with an elastic member such as a rubber member interposed between them. It should be noted that, in conventional power steering units, the housing located close to the steering column is rigidly secured to the vehicle main body and hence the sounds and vibrations generated by the electric motor 1 can easily be transmitted to the steering wheel to get the steering feeling worse. To the contrary, in this power steering unit, as the housing A is secured by means of a bracket 9 and a rubber member is arranged between the bracket 9 and the housing A, the sounds and vibrations are damped there and prevented from being transmitted further to the steering column 5.

Additionally, since the armature shaft 11 and the nut section 19 are separably linked by means of splines in this embodiment, no caulking is necessary for assembling the ball-screw mechanism 3 to the housing by means of screws so that the unit can be assembled with ease and it is possible to reduce assembling time.

Now, the embodiment of power steering unit of the invention operates in a manner as described below. Firstly, as the steering wheel is operated by the driver to turn the steering column 5 and the rack-shaft 2 is moved in the direction corresponding to the sense of rotation of the steering column 5 to carry out a necessary steering operation. At the same time, a steering torque sensor (not shown) detects the torque generated by the rotary motion of the steering column 5 and consequently the commutator 22 is supplied with electric power corresponding to the detected torque from the terminal plate 26 having the coupler 28 via the brush 23. As the electric motor 1 is driven to operate the armature shaft 11 and hence the nut section 19 coupled to it are rotated. As the nut section 19 rotates, the steering assisting power is transmitted to the rack-shaft 2 under the effect of the ball-and-screw mechanism 3, whereby the movement of the rack-shaft 2 is promoted and the steering power is assisted.

With this embodiment, if the wheels of the motor vehicle is turned to an extreme, the axial reaction force of the nut section 19, generated by the inertia on the part of the armature shaft 11 and other related components, is not transmitted to the armature shaft 11. Even if the rack-shaft 2 is made to halt as it abuts the stopper (not shown) arranged on the corresponding tie rod during a servicing operation or when the steering wheel is turned while the vehicle is standing still, the reaction force of the nut section 19 is transmitted to the housing B from the nut section 19 and hence the armature shaft 11 is not subjected to any axial force.

Figure 5:
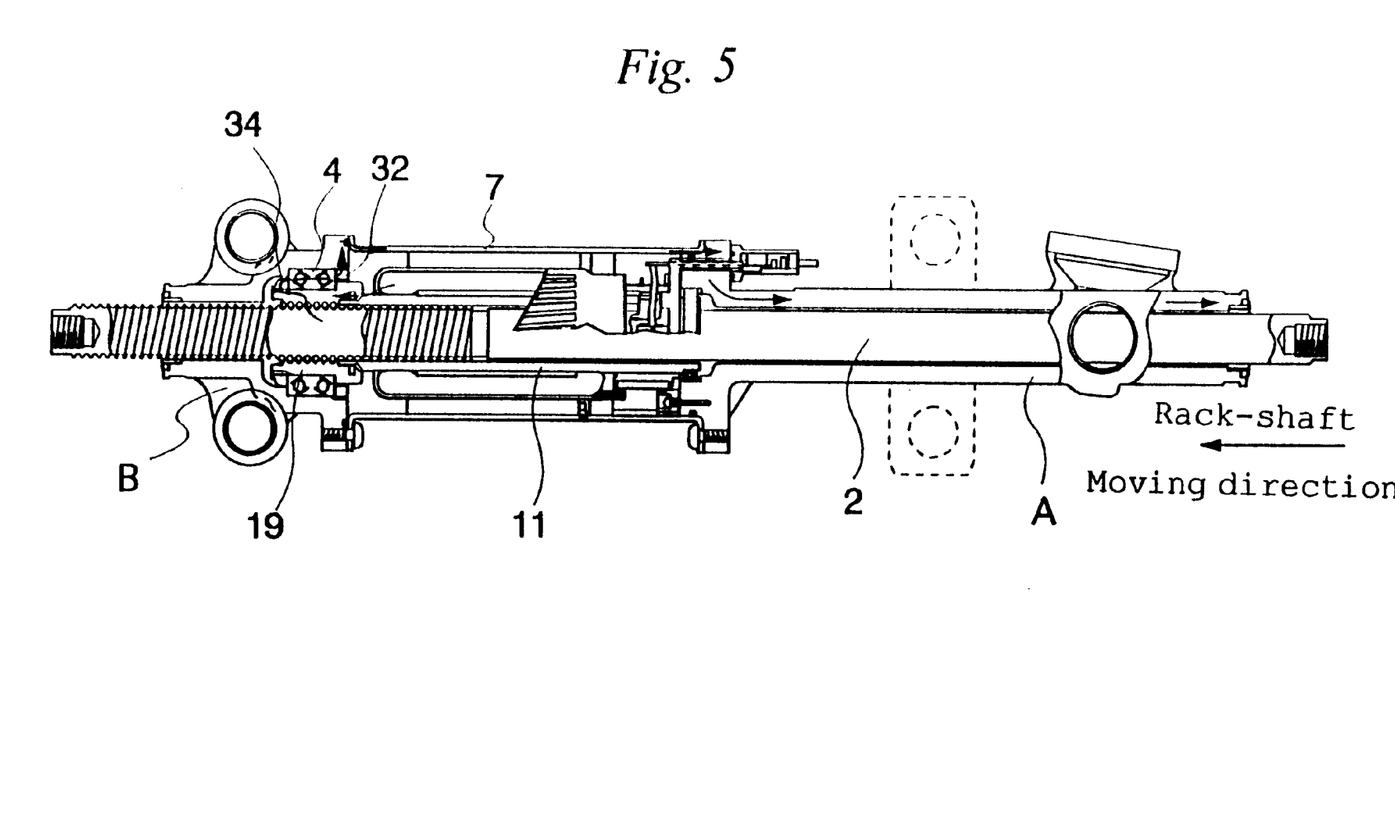
FIG. 5 is a schematic cross sectional view showing the power transmission path established when the stopper fitted to the right side of the rack-shaft abuts the corresponding housing.

This will be described in greater detail by referring to FIGS. 5 and 6. FIG. 5 is a schematic cross sectional view showing the power transmission path established when the stopper (not shown) fitted to the right side of the rack-shaft 2 abuts the housing A when the rack-shaft 2 is moved leftward in FIG. 5. FIG. 6 is a schematic cross sectional view showing the power transmission path formed when the rack-shaft 2 is moved rightward in FIG. 6. Note that hatching is omitted in the cross sectional views of FIGS. 5 and 6 for easy viewing.

Firstly, assume that the rack-shaft 2 is moved leftward and then halted by the stopper there. Then, the armature shaft 11 is halted at the same time but a rotary force trying to keep on rotating the nut section 19 in the sense it used to rotate the latter before the halt and hence tending to move the rack-shaft 2 further left is generated by the inertia force of the armature shaft 11. However, since the movement of the rack-shaft 2 is checked by the stopper and it cannot move leftward any further. Consequently, the rack-shaft 2 generates a corresponding reaction force in the nut section 19, which is then transmitted to the housing B by way of the bearing holder ring 34, the angular bearing 4 and the bearing holder ring 32 as indicated by arrows in FIG. 5. Then, this force tends to compress the yoke 7, which by turn transmits it to the housing A and returned to the stopper.

Next, in FIG. 1, assume that the rack-shaft 2 is moved rightward and then halted by the stopper there. As in the aforementioned case, the a force tending to move the rack-shaft 2 further right is generated by the inertia of the armature shaft 11 and consequently a corresponding reaction force is generated in the nut section 19 and transmitted to the housing B by way of the stepped section 35, the angular bearing 4 and the stepped section 33, then the force is returned to the stopper as indicated by arrows in FIG. 6.

Thus, the force generated by the inertia of the armature shaft 11 is always returned to the related stopper by way of the angular bearing 4 and the housing B so that the armature shaft 11 is subjected only to rotary force. In other words, only rotary power is transmitted between the armature shaft 11 and the nut section 19 so that the can be linked by way of tapered splines without the gap under the pressure of rubber member 21.

Further, unlike the armature shaft 11 of the conventional power steering units, the armature shaft 11 of this embodiment is free from tensile or compressive force so that it may meet less rigorous requirements in terms of strength and hence material and thickness can be designed and manufactured on the eased condition, therefore, it is possible to lower the cost and to improve the efficiency of manufacturing.

Additionally, it will be understood by comparing FIGS. 1 and 2 with FIG. 11 that the armature shaft and the yoke of this embodiment have very simplified respective profiles. More specifically, the armature shaft 11 does not have any neck-like section and have a reduced length, a fact that can remarkably reduce the manufacturing cost of the armature shaft 11 along with the less rigorous requirements to be met for the strength as described above. Still additionally, since the inertia of the armature shaft is reduced, it is possible to ease the impact force when the wheels are turned to the extremes and to improve the response speed.

Next, a second embodiment according to the invention will be described by referring to FIG. 7. This embodiment differs from the first embodiment in that the splines connecting the armature shaft 11 and the nut section 19 are made longer than their counterparts of the first embodiment to improve the efficiency of torque transmission. Since the remaining components of the embodiment are similar to those of the first embodiment, they will not be described any further.

Figure 7:
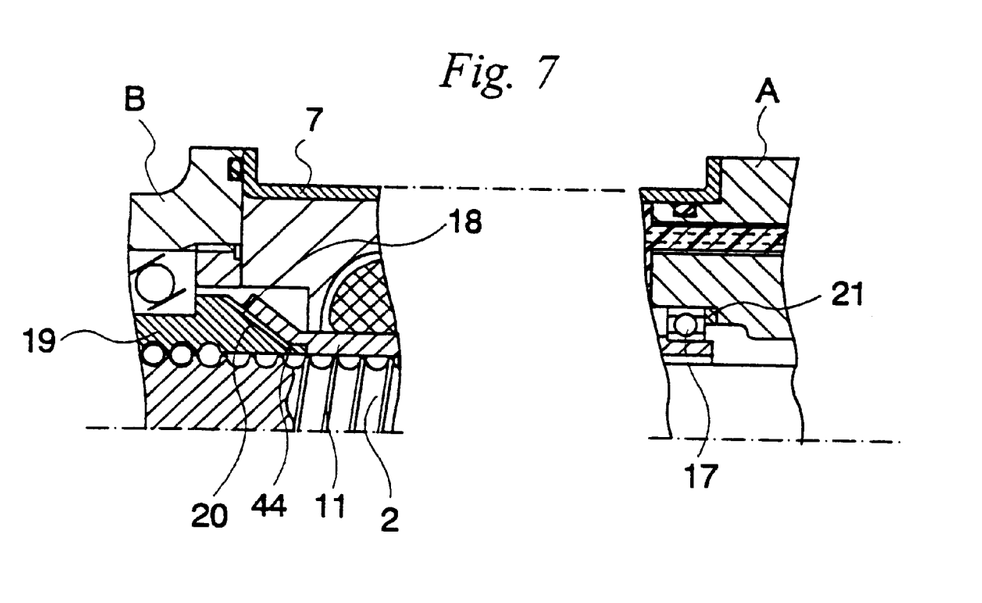
FIG. 7 is a schematic cross sectional view of the armature shaft and the ball-screw mechanism of a second embodiment of power steering unit according to the invention, showing how they are linked with each other.

As seen from FIG. 7, the end portion of the armature shaft 11 of this embodiment is flared, and a spline 18 is formed on the inner surface of the flared section. On the other hand, the corresponding end portion of the nut section 19 is tapered, and a spline 20 is formed on the outer surface thereof. The splines 18 and 20 are brought into engagement to link the armature shaft 11 and the nut section 19 by inserting the end portion of the nut section 19 into the end of the armature shaft 11.

The other end of the armature shaft 11 is supported by a bearing 17 that is held by the housing A by way of a rubber member 21. Thus, as in the case of the first embodiment, the spline 18 is pressed against and engaged with the spline 20 by the elastic force of the rubber member 21 to reliably transmit the revolution of the armature shaft 11 to the nut section 19. It may be needless to say that the rubber member 21 can be replaced by a wave washer etc..

Figure 3:
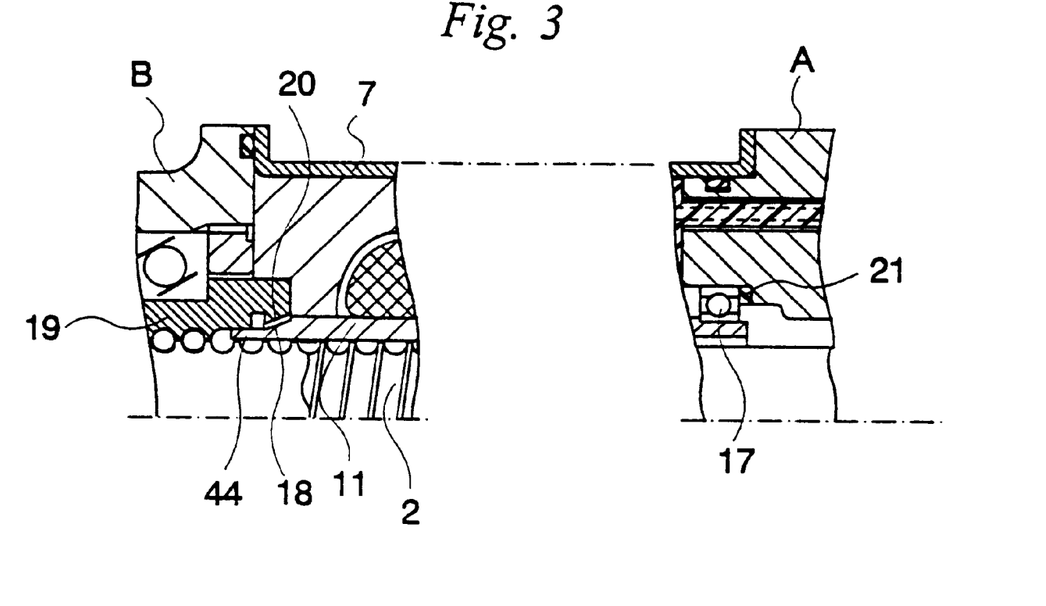
FIG. 3 is a schematic cross sectional view of the armature shaft and the ball-screw mechanism of the first embodiment of power steering unit of FIG. 1, showing how they are linked with each other.

The tapered spline 18 of FIG. 3 is formed by using the thickness of the armature shaft 11. However, since the armature shaft 11 is thin the spline 18 has a limited length, so that the torque that can be transmitted by way of the spline 18 is limited and severe strength condition is required of the spline 18. Contrary to that, the armature shaft 11 of this embodiment is flared at the end and to ease the strength condition, so that a longer spline 18 may be arranged there. Thus, both the splines 18 and 20 are made longer than their counterparts of FIG. 3 and adapted to transmit a greater torque, and to ease the strength condition.

While the spline 18 of the armature shaft 11 of FIG. 3 is formed by butting and pushing the end, the end can be flared by the similar butting and pushing operation. Therefore, the spline 18 of FIG. 7 can be prepared by the similar processing steps without using any additional processing step.

Additionally, a third embodiment according to the invention will be described by referring to FIG. 8. This embodiment is designed to transmit the rotary power of the armature shaft 11 to the nut section 19 in the form of frictional force and hence the related portions thereof operate as torque limiter. Since this embodiment is similar to the first embodiment except the arrangement of linking the armature shaft 11 and the nut section 19 and the configuration of the bearing supporting the right end of the armature shaft 11 in FIG. 1, the detail constitution will not be described any further.

Figure 8:
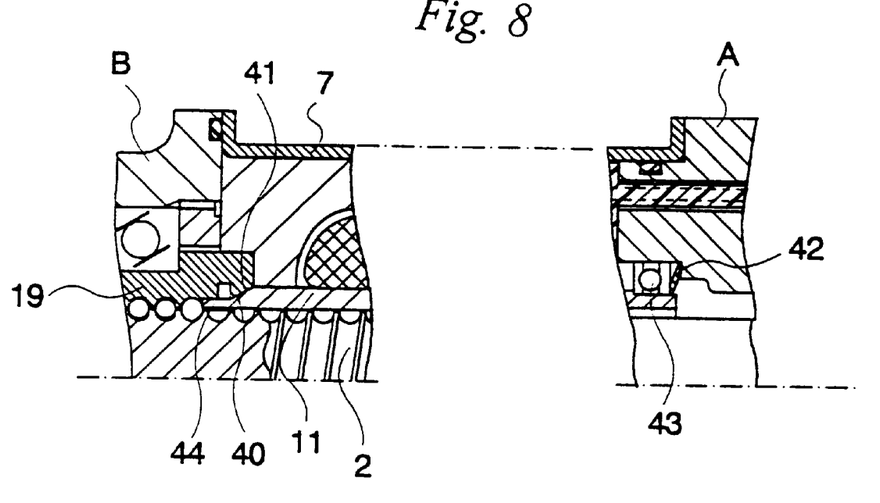
FIG. 8 is a schematic cross sectional view of the armature shaft and the ball-screw mechanism of a third embodiment of power steering unit according to the invention, showing how they are linked with each other.

Referring to FIG. 8, a tapered frictional surface 40 is formed on the end portion of the armature shaft 11. Likewise, a tapered frictional surface 41 is also formed on the end portion of the nut section 19 corresponding to the end portion of the armature shaft 11. The other end of the armature shaft 11 is supported by a thrust bearing 43 that is held by the housing A by way of a coned disc spring 42 so that the frictional surface 40 of the armature shaft 11 is pressed against the frictional surface 41 of the nut section 19 by the elastic force of the coned disc spring 42 to transmit the revolution of the armature shaft 11 to the nut section 19. The frictional surfaces 40 and 41 are formed by metal or a facing material. The coned disc spring 42 may be of any type and may be replaced by a rubber member, a wave washer or a member made of synthetic resin so long as a sufficient frictional force is provided.

The armature shaft 11 is supported at the opposite end by a thrust bearing 43 because of the large thrust that the thrust bearing offers to axially urge the armature shaft 11. When the frictional surfaces 40 and 41 are pressed against each other to frictional transmit the rotary force of the armature shaft 11 to the nut section 19, the force required to engage the members is larger than the coupling arrangement using splines of the first and second embodiments. The armature shaft 11 has to be rotatably supported under a thrusting load exerted by such a thrust bearing. Thus, a thrust bearing 43 is used in this third embodiment instead of the radial bearing. Note that, however, a radial bearing may nevertheless be used if it can provide a sufficient thrusting load and operate satisfactorily.

Due to the frictional coupling of the armature shaft 11 and the nut section 19 of this embodiment, the frictional surfaces 40 and 41 start sliding on each other when load applied to them exceeds the fractional force. In other words, they operate as torque limiter for releasing any excess in the load being applied to them. Accordingly, the electric motor 1 is also relieved of any excessive load as the frictional surfaces 40 and 41 can effectively absorb the force of inertia that may be generated in the armature shaft 11 when the steering column is turned to an extreme and the rack-shaft 2 is abruptly halted. Consequently, the embodiment can suppress any significant force of reaction on the part of the rack-shaft 2. Thus, this embodiment is allowed to ease rigorous strength-related requirement and it is possible to design and manufacture the products under the advantages conditions in terms of dimensions and cost.

For securing the yoke 7 to the housing B of this embodiment, they are secured to each other by means of screws while the frictional surface 40 of the armature shaft 11 is held in contact with the frictional surface 41 of the nut section 19. As a result, the frictional surfaces 40 and 41 are pressed against each other by the elastic force of the coned disc spring 42 so that the armature shaft 11 and the nut section 19 are engaged with each other by the frictional force generated there.

If, as described above, the steering column is turned to an extreme, the inertia of the electric motor 1 can be released by the sliding between the frictional surfaces 40 and 41. namely, the frictional surfaces 40 and 41 operate as torque limiter and suppress any force of reaction due to the inertia of the electric motor 1.

For example, assume that the rack-shaft 2 is moved leftward in FIG. 1 and the stopper (not shown) arranged on the right side of the rack-shaft 2 abuts the housing A and the rack-shaft 2 is hauled. Then, the armature shaft 11 is halted at the same time but rotary force trying to keep on rotating the nut section 19 before the halt is generated by the inertia, that is, the force tending to move the rack-shaft 2 further left is generated. However, since the movement of the rack-shaft 2 is checked by the stopper and it cannot move leftward any further. Thus, the armature shaft 11 tends to rotate further despite that the nut section 19 is halted. Then, force being larger than the frictional force acts between the frictional surfaces 40 and 41 so that they start sliding on each other, thereby the inertia of the armature shaft 11 is absorbed and it prevents the inertia being transmitted to nut section 19.

Thus, the power steering unit of this embodiment, the armature shaft 11 is subjected only to rotary force. Therefore, unlike the armature shaft 11 of the conventional power steering units, the armature shaft 11 of this embodiment is free from tensile or compressive force so that it may meet less rigorous requirements in terms of strength and hence material and thickness can be designed and manufactured on the eased condition, therefore, it is possible to lower the cost and to improve the efficiency of manufacturing.

A forth embodiment according to the invention will be described by referring to FIG. 8. This embodiment is characterized in that the frictional surfaces 40 and 41 of the armature shaft 11 and the nut section 19 are made to show an increased area to improve their torque transmitting performance. Since this embodiment is otherwise same as the third embodiment, the detail constitution will not be described any further.

Figure 9:
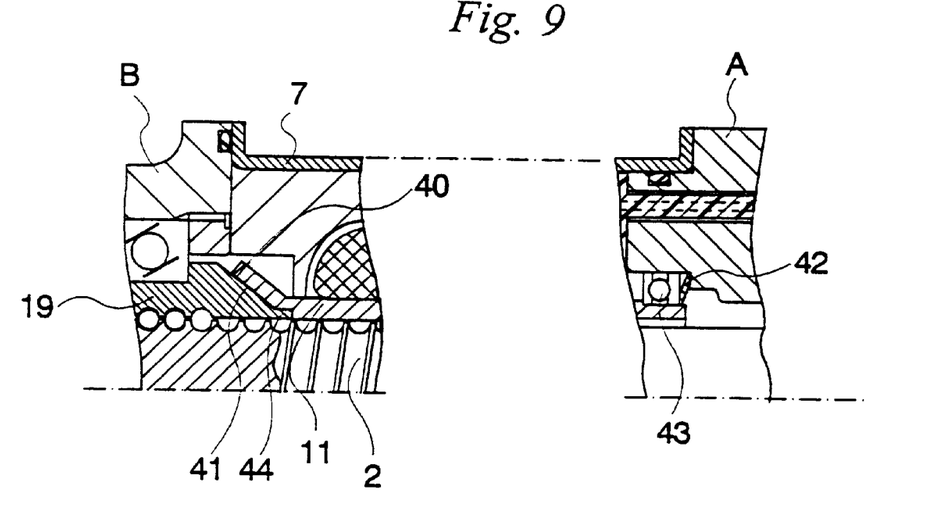
FIG. 9 is a schematic cross sectional view of the armature shaft and the ball-screw mechanism of a fourth embodiment of power steering unit according to the invention, showing how they are linked with each other.
Figure 10:
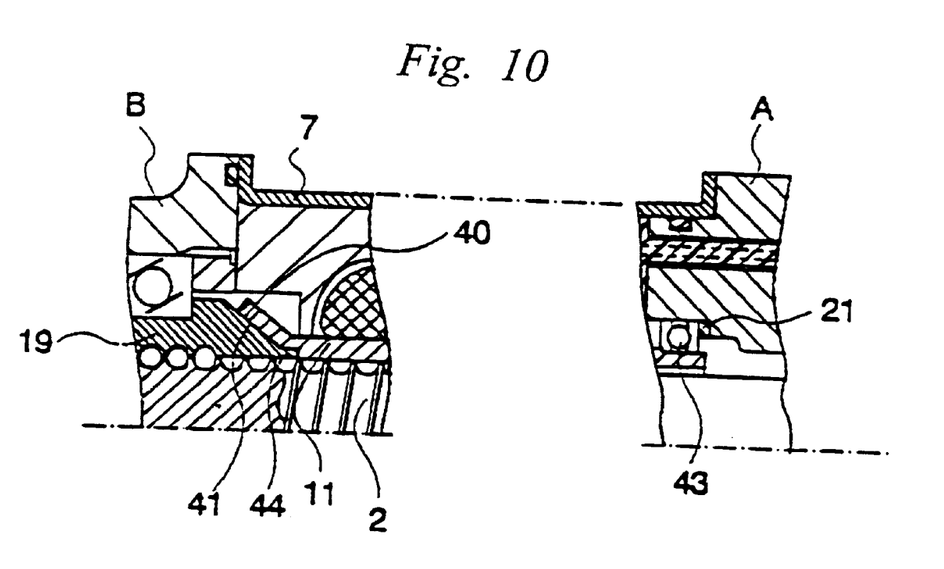
FIG. 10 is a schematic cross sectional view of the armature shaft and the ball-screw mechanism obtained by modifying those of FIG. 9.

As seen from FIG. 9, the end portion of the armature shaft 11 is flared and a frictional surface 40 is formed on the inner surface thereof. On the other hand, the corresponding end portion of the nut section 19 is tapered and provide a frictional surface 41 is formed on the tapered surface. The frictional surfaces 40 and 41 are also formed by metal or a facing material. The frictional surfaces 40 and 41 are pressed against each other as the front end of the nut section 19 is introduced into the corresponding end of the armature shaft 11.

The opposite end of the armature shaft 11 is supported by a thrust bearing 43 that is held to the housing A by way of a coned disc spring 42. The frictional surface 40 of the armature shaft 11 is pressed against the frictional surface 41 of the nut section 19 by the elastic force of the coned disc spring 42 and the armature shaft 11 is connected with the nut section 19, so that the revolution of the armature shaft 11 is transmitted to the nut section 19. The coned disc spring 42 may be of any type and may be replaced by a rubber member, a wave washer or a member made of synthetic resin so long as a sufficient frictional force is provided.

With the embodiment of FIG. 8, as mentioned in the second embodiment, since the frictional surface 40 is formed by using the thickness of the armature shaft 11, the frictional surface 40 has a limited area. Contrary to that, the end portion of the armature shaft 11 of this embodiment is flared and a frictional surface 40 is formed on the inner surface of the flare, so that the diameter of the frictional surface 40 is larger. Thus, both average diameter of the frictional surfaces 40 and 41 are made greater than their counterparts of FIG. 8 and adapted to transmit a greater torque, while the pressure of the coned disc spring 42 may be reduced. Additionally, the frictional force generated there is stable to by turn stabilize the transmitted torque due to the large contacting area. Note, as the pressure required to the coned disc spring 42 is reduced, the thrust bearing 43 may be replaced by a radial bearing and the coned disc spring 42 may be replaced by a rubber member. This embodiment is adapted to transmit rotary power in the form of frictional force, therefore, the frictional surfaces 40 and 41 operate as torque limiter like those of the third embodiment.

Meanwhile, grease is applied to the surface of the balls 31 of the ball-screw mechanism 3. This grease, if partly, can be transferred to the frictional surfaces 40, 41 through the contact area of the armature shaft 11 and the nut section 19. If grease gets to the frictional surfaces 40 and 41, the frictional force between them is changed and it obstruct the transmission of rotary force from the armature shaft 11 to the nut section 19. This embodiment of power steering unit is provided with a grease stopper 44 arranged on the front end of the nut section 19 as shown in FIG. 9 in order to prevent any grease from getting to the frictional surfaces 40 and 41.

Note that, in other embodiment, a grease stopper 44 is arranged on the front end of the armature shaft 11 and/or that of the nut section 19 in order to avoid grease that can get to the contact area of the armature shaft 11 and the nut section 19.

Detailed description has hereinabove been give of the invention achieved by the present inventor with reference to the embodiments. However, the present invention should not be limited to the embodiments described above and may be variously modified within the scope not departing from the gist.

For example, while each of the above embodiments is composed of three major components of a housing A, a housing B and a yoke 7, they may be differently arranged, for example, the housing A and the yoke 7 may be combined into a unitary component so long as the rack-shaft 2 is supported by two points.

For instance, a brushless electric motor may be used for an power steering unit according to the invention. If such is the case, the field device has a core and magnets respectively arranged on the yoke side and the armature shaft side while the power supply section has a circuit board comprising conducting means and a detector for detecting the angular position of the armature shaft. Additionally, the present invention is applicable not only to front wheels steering unit but also to rear wheels steering unit having the same constitution and mounting condition as the front wheels steering unit.

Finally, while the present invention is described particularly in terms of power steering unit of motor vehicle, it may be applied to any industrial machines and vehicles provided with a steering system.

The advantages of the present invention may be summarized as follows.

Since the rack-shaft is not supported by three points such as the conventional power steering unit but supported by two points, the precision requirement for machining and assembling the components are eased and hence the manufacturing cost thereof is reduced. Additionally, jarring and an unpleasant steering feeling may sense due to the gap and rub of the rack-shaft can be effectively avoided.

The second housing for containing and retaining the ball-screw mechanism is positionally regulatable. This allows any misalignment to be corrected that may occur when the second housing is arranged in position.

The nut section of the ball-screw mechanism is provided independent of the armature shaft so that they may be separated from each other any time if necessary. Thus, the ball-screw mechanism can be secured to the power steering unit simply by means of screws etc., and the caulking process can be eliminated. This greatly enhance the overall workability of the unit assembling and reduces the number of assembling steps and hence the manufacturing cost.

The nut section of the ball-screw mechanism is linked to the armature shaft by way of a torque limiter mechanism to release the inertia of the electric motor by way of the sliding frictional surfaces. Thus, the force of reaction due to the inertia of the electric motor can be eliminated, and it is possible to ease strength-related requirements. Then, the product can be down-sized and manufactured at reduced cost.

What is claimed is:

1. An electric power steering unit comprising a rack-shaft to be coupled to the guiding wheels of a vehicle, a first housing for slidably containing the rack-shaft and holding therein a coupling section for causing the teeth of the rack-shaft to engage those of a pinion arranged on the steering column linked to the steering handle of the vehicle, an electric motor coaxially arranged around the rack-shaft to supply assisting power to the rack-shaft and a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, characterized by:

said nut section of the ball-screw mechanism is rotatably supported and is also rigidly radially supported by a second housing arranged independent of said first housing, which nut section also supports said armature shaft; and said rack-shaft is axially movable and is rigidly radially supported at two points of support, one at said coupling section and the other at said nut section supported by said second housing.

2. A power steering unit according to claim 1, characterized in that:

said second housing is positionally regulatable to correct misalignment of said rack-shaft.

3. A power steering unit according to claim 1, characterized in that:

said nut section of the ball-screw mechanism is separably linked to said armature shaft.

4. A power steering unit according to claim 3, characterized in that:

said nut section and said armature shaft are provided at the respective ends thereof with tapered splines that are engaged with each other to link said nut section and said armature shaft.

5. A power steering unit according to claim 3, characterized in that;

said nut section and said armature shaft are provided at the respective ends thereof with tapered frictional surfaces that are pressed against each other to link said nut section and said armature shaft.

6. A power steering unit according to claim 1, characterized in that:

said nut section of the ball-screw mechanism is linked to said armature shaft by means of a torque limiter mechanism.

7. A power steering unit according to claim 6, characterized in that:

said torque limiter mechanism is so configured that tapered frictional surfaces respectively arranged at the respective ends of said nut section and said armature shaft are pressed against each other by means of an elastic member arranged at the other end side of said armature shaft.

8. An power steering unit according to claim 1, characterized in that:

said nut section is rotatably drivingly linked to said armature shaft by a coupling permitting axial and radial movement of said nut section and armature shaft relative to one another.

* * * * *